US012501203B2

(12) United States Patent
Daggumati

(10) Patent No.: US 12,501,203 B2
(45) Date of Patent: Dec. 16, 2025

(54) WEARABLE SOUND DEVICE AND MANUFACTURE METHOD THEREOF

(71) Applicant: xMEMS Labs, Inc., Santa Clara, CA (US)

(72) Inventor: Vijay Daggumati, Santa Clara, CA (US)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 19/015,687

(22) Filed: Jan. 10, 2025

(65) Prior Publication Data

US 2025/0240555 A1 Jul. 24, 2025

Related U.S. Application Data

(60) Provisional application No. 63/622,564, filed on Jan. 19, 2024.

(51) Int. Cl.
*H04R 1/10* (2006.01)
*H04R 1/24* (2006.01)
*H04R 31/00* (2006.01)

(52) U.S. Cl.
CPC ......... *H04R 1/1075* (2013.01); *H04R 1/1016* (2013.01); *H04R 1/24* (2013.01); *H04R 31/006* (2013.01); *H04R 2460/11* (2013.01)

(58) Field of Classification Search
CPC .. H04R 1/1066; H04R 1/1041; H04R 1/1075; H04R 1/1091; H04R 1/1016; H04R 7/06; H04R 31/00; H04R 9/045; H04R 2460/11; H04R 17/00; H04R 3/04; H04R 9/047; H04R 7/122; H04R 19/005; H04R 2201/003; H04R 7/24; H04R 3/06; H04R 1/1008; H04R 1/1083; H04R 2420/07; H04R 2460/01; G10K 15/04
See application file for complete search history.

(56) References Cited

U.S. PATENT DOCUMENTS 12,028,673 B2 * 7/2024 Lo ........................ H04R 19/005
12,088,988 B2 * 9/2024 Chen ...................... H04R 31/00
12,151,934 B2 * 11/2024 Lu .......................... H04R 31/00
12,157,663 B2 * 12/2024 Chang .................. B81B 3/0021
2014/0133668 A1 * 5/2014 Podoloff ............. H04R 1/1041 381/74
2018/0084328 A1 * 3/2018 Ernst .................... H04R 1/1041
2020/0196067 A1 * 6/2020 Rusconi Clerici Beltrami ........... H04R 1/24
2020/0211521 A1 * 7/2020 Voss ......................... H04R 7/04
2020/0213770 A1 * 7/2020 Duan ...................... H04R 17/02
2020/0352788 A1 * 11/2020 Van 'T Hof ......... H04R 1/1016
2022/0174431 A1 * 6/2022 Johansen ............. H04R 25/656
2023/0022343 A1 * 1/2023 Freire .................. H04R 1/1058

* cited by examiner

*Primary Examiner* — Carolyn R Edwards
*Assistant Examiner* — Julie X Dang
(74) *Attorney, Agent, or Firm* — Winston Hsu

(57) ABSTRACT

A wearable sound device and a manufacture method thereof are disclosed to improve user experience. The wearable sound device includes a venting device, configured to form a vent to connect a first volume within the wearable sound device and ambient, and a sound producing device, adjacent to the venting device, configured to produce sound toward the first volume.

21 Claims, 7 Drawing Sheets

WEARABLE SOUND DEVICE AND MANUFACTURE METHOD THEREOF

CROSS REFERENCE TO RELATED APPLICATIONS

This application claims the benefit of U.S. Provisional Application No. 63/622,564, filed on Jan. 19, 2024. The content of the application is incorporated herein by reference.

BACKGROUND OF THE INVENTION

1. Field of the Invention

The present invention relates to a wearable sound device and a manufacture method thereof, and more particularly, to a wearable sound device and a manufacture method thereof for improving user experience.

2. Description of the Prior Art

Occlusion effect arises from the sealed volume of an ear canal, which causes perceived pressure for the listener. For example, occlusion effect occurs when the listener wearing a wearable sound device in his/her ear canal engages in specific movement(s) that generates bone-conducted sound (e.g., jogging). However, releasing the pressure inside a closed field chamber may impact frequency response, which degrades user experience especially in low-frequency bass part of music. There is room for further improvement when it comes to audio quality optimization.

SUMMARY OF THE INVENTION

It is therefore a primary objective of the present application to provide a wearable sound device and a manufacture method thereof, to improve over disadvantages of the prior art.

An embodiment of the present application discloses a wearable sound device, comprising a venting device, configured to form a vent to connect a first volume within the wearable sound device and ambient; and a sound producing device, adjacent to the venting device, configured to produce sound toward the first volume.

Another embodiment of the present application discloses a manufacture method, for manufacturing a wearable sound device, comprising forming a venting device; forming a sound producing device, adjacent to the venting device; and assembling the venting device and the sound producing device, such that the venting device is configured to form a vent to connect a first volume within the wearable sound device and ambient, and the sound producing device is configured to produce sound toward the first volume.

These and other objectives of the present invention will no doubt become obvious to those of ordinary skill in the art after reading the following detailed description of the preferred embodiment that is illustrated in the various figures and drawings.

DETAILED DESCRIPTION

A dynamic vent needs to be properly placed within an earbud to achieve optimal occlusion effect relief or noise isolation. For example, placing the dynamic vent in a front chamber of the earbud, instead of in a back chamber of the earbud, can reduce whistle noise and improve occlusion effect relief, frequency response, or total harmonic distortion (THD).

Figure 1:
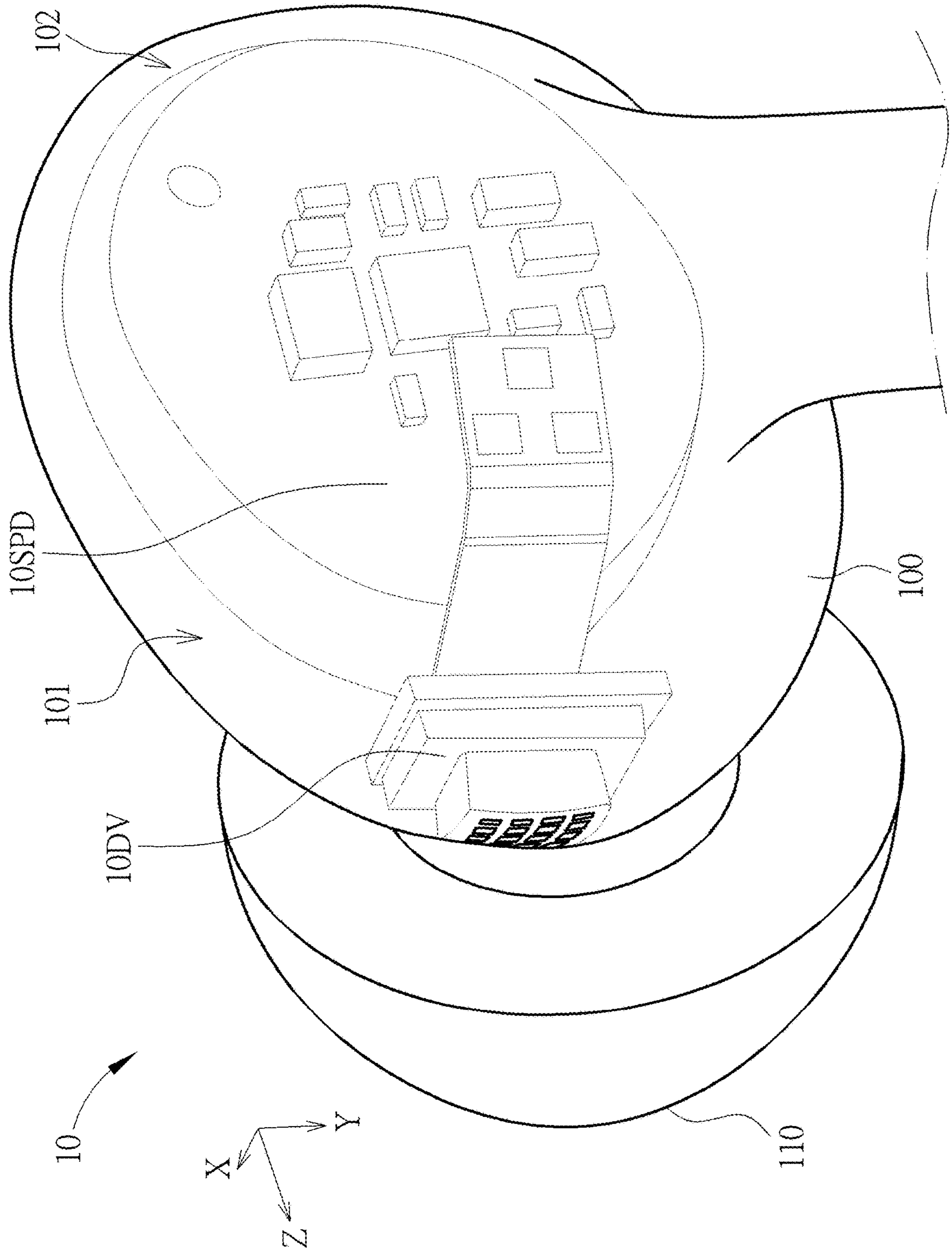
FIG. 1 to FIG. 3 are schematic diagrams of a wearable sound device according to an embodiment of the present application.
Figure 2:
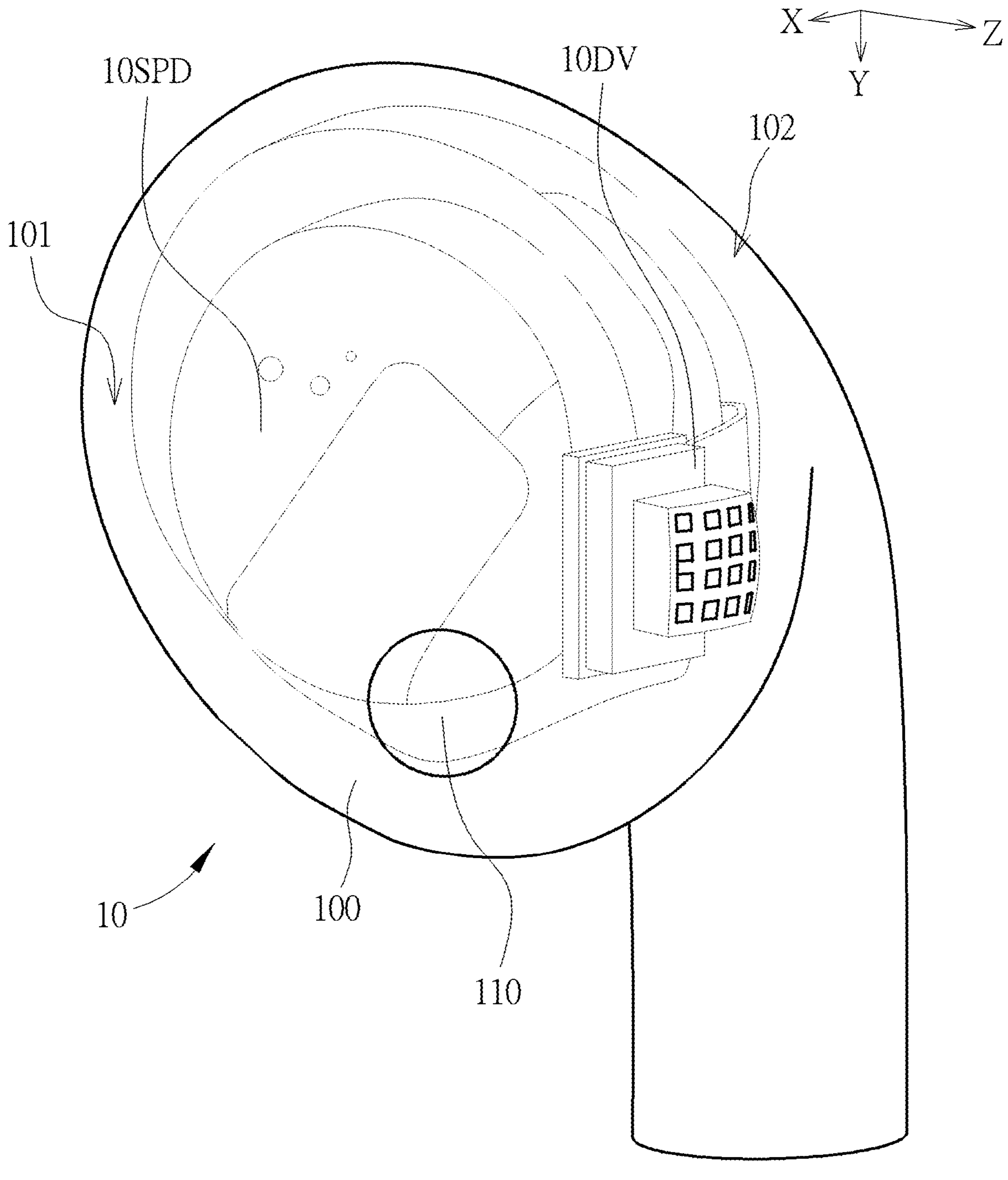
Figure 3:
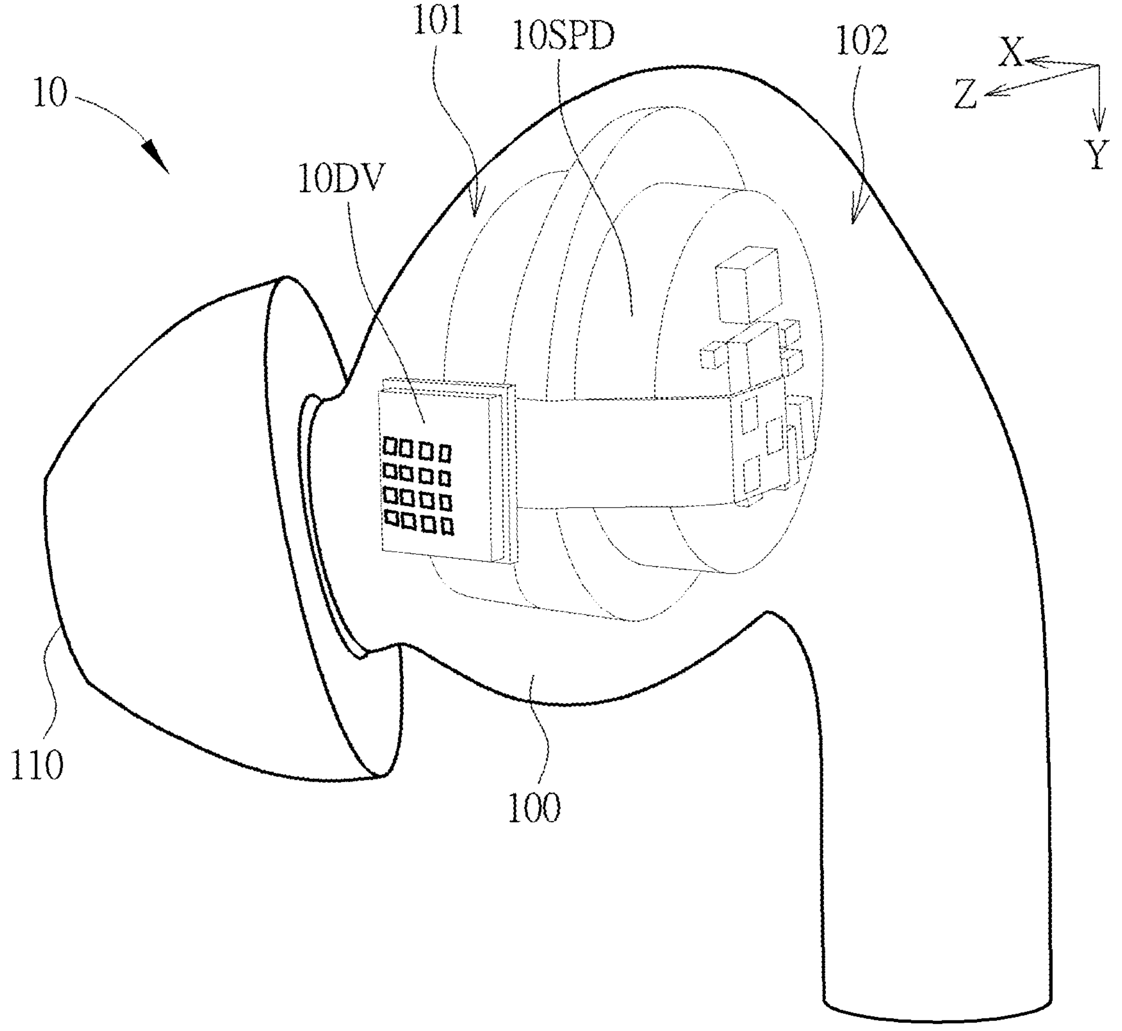

FIGS. 1-3 demonstrate such configuration of a venting device 10DV. In FIG. 1, a wearable sound device 10 comprises the venting device 10DV and a sound producing device 10SPD. A film structure of the sound producing device 10SPD may divide the wearable sound device 10 into a front volume/chamber 101 and a back volume/chamber 102. The venting device 10DV is disposed in the front volume 101, and may form a vent (e.g., 513vnt in FIG. 5), connecting the front volume 101 to the surrounding environment.

Both the front volume 101 and the back volume 102 are acoustically defined with respect to the sound producing device 10SPD. The front volume 101 acoustically connects one side of the film structure of the sound producing device 10SPD to an acoustic port 110. As a result, sound generated by the sound producing device 10SPD can travel from the front volume 101 to the acoustic port 110, and then to an ear canal of a user. A housing 100 of the wearable sound device 10, within which the sound producing device 10SPD and the venting device 10DV are disposed, may define the acoustic port located between the front volume 101 and an ear canal (or the surrounding environment). The back volume 102 is acoustically coupled to the opposite side of the film structure of the sound producing device 10SPD. Generally, a user seldom senses any significant air pressure change of the back volume 102.

Placing the venting device 10DV in the front volume 101 can reduce whistle noise and improve occlusion effect relief. In contrast, in a case that a venting device (not shown) is disposed in the back volume 102, a long channel, which is formed to connect the back volume 102 to the front volume 101 for the venting device, captures air, which leads to loud whistle noise. This long channel hampers the performance of the venting device in the back volume 102 (e.g., resulting in low frequency roll off (LFRO) being about 50% of a target value). However, since the venting device 10DV is in the front volume 101, and the vent of the venting device 10DV can connect the front volume 101 directly to the surrounding environment, the long channel effect does not occur.

Placing the venting device 10DV in the front volume 101 may improve frequency response and THD for the sound producing device 10SPD. In contrast, in a case that a venting device (not shown) is disposed in the back volume 102, frequency response dips occur at 5 and 7 kHz, which creates large THD spikes (>10%) for a woofer. However, as the venting device 10DV is in the front volume 101, acoustic performance of the sound producing device 10SPD is improved.

To enhance performance, the venting device 10DV is positioned close to the outer shell of the housing 100 of the wearable sound device 10 with a minimal distance to the atmosphere. The vent of the venting device 10DV may mark the boundary between the wearable sound device 10 and the ambient.

As shown in FIG. 1, the angle between a film structure of the venting device 10DV (e.g., in a close mode) and the film structure of the sound producing device 10SPD (e.g., in an unactuated status) is substantially greater than 0 degrees. Specifically, the film structure of the venting device 10DV, configured to create/seal a vent, is substantially parallel to a virtual plane in a mode (e.g., a close mode), but is bent/swung to form the vent in another mode (e.g., an open mode). Similarly, the film structure of the sound producing device 10SPD, configured to oscillate/move to produce sound, is substantially parallel to another virtual plane in a mode (e.g., an unactuated status) but is usually oscillated/moved around the virtual plane. The virtual plane for the venting device 10DV may be perpendicular to the virtual plane for the sound producing device 10SPD.

The angle between a venting device and a sound producing device may vary on a case-by-case basis. For example, FIG. 4 demonstrates an arrangement of a venting device 40DV and a sound producing device 40SPD in a wearable sound device 40. The angle between a film structure 411F of the venting device 40DV (in a close mode) and a film structure 400F of the sound producing device 40SPD (in an unactuated status) is substantially near 0 degrees.

Figure 4:
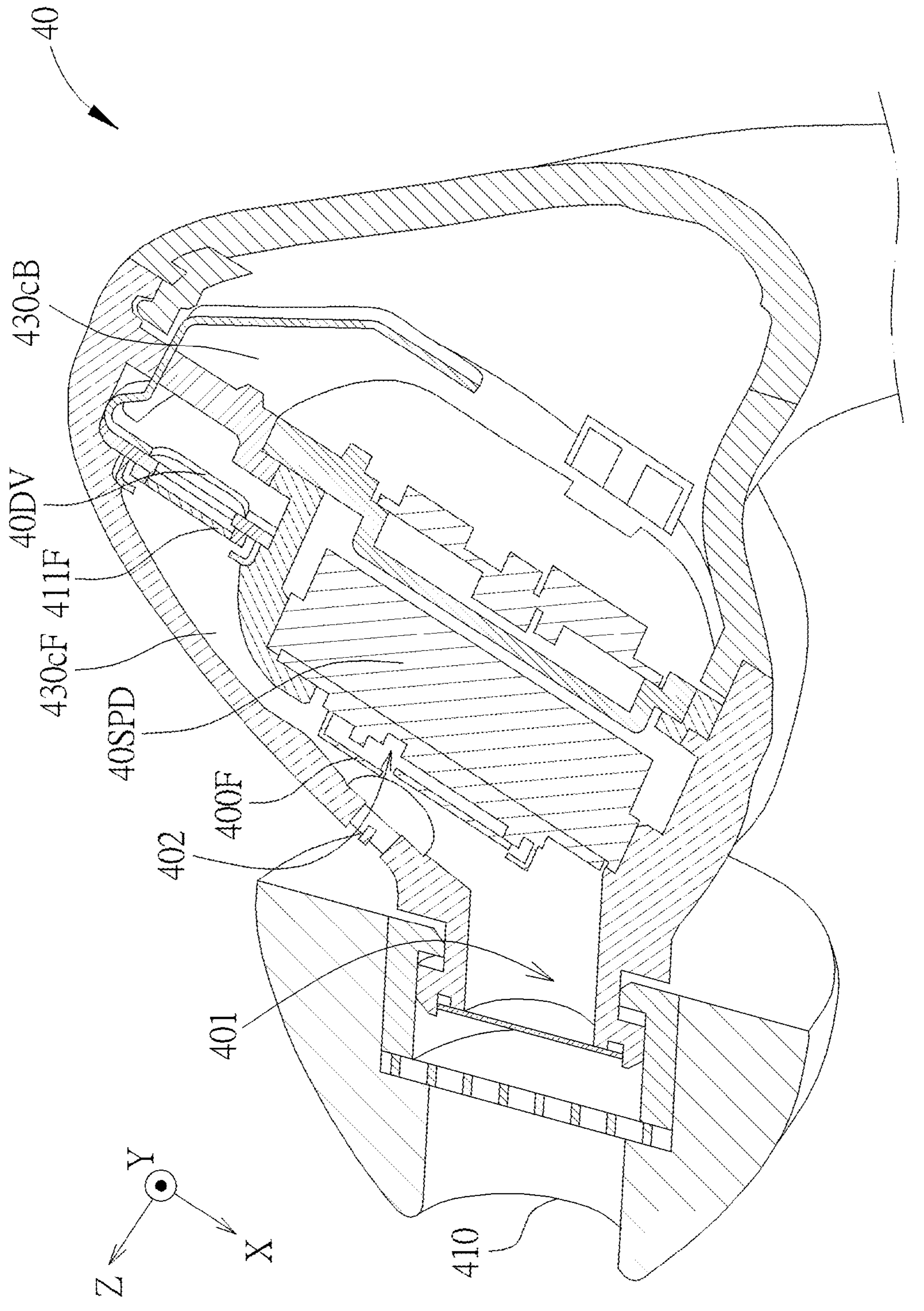
FIG. 4 is a schematic diagram of a wearable sound device according to an embodiment of the present application.

As shown in FIG. 4, the venting device 40DV is substantially disposed in a front chamber 401 of the wearable sound device 40 to reduce the negative effects of occlusion. Specifically, the venting device 40DV may form a vent (e.g., 513vnt in FIG. 5) to connect its volume/channel 430*c*F to its volume/channel 430*c*B. Since the volume 430*c*F is connected to the front chamber 401 and the volume 430*c*B is connected to the ambient, the vent of the venting device 40DV connects the front chamber 401 directly to the surrounding environment without forming a long channel. The vent formed within the venting device 40DV reduces occlusion effect.

A volume/channel of the venting device 40DV may differ from a volume/chamber of the sound producing device 40SPD. In terms of the sound producing device 40SPD, the front volume 401 acoustically connects one side of the film structure 400F to an acoustic port 410, allowing the produced sound to emit through the acoustic port 410. A vent of the venting device 40DV, which is between the volumes 430*c*F and 430*c*B, is configured to connect an ear canal of a user to the ambient when the vent is formed. In FIG. 4, the front volume 401 is connected to the volume 430*c*F, which is connected to or to be connected to an ear canal through acoustic port 110. However, the volume 430*c*B, which is connected to or to be connected to the ambient, may not be connected to a back volume 402 of the wearable sound device 40.

Figure 5:
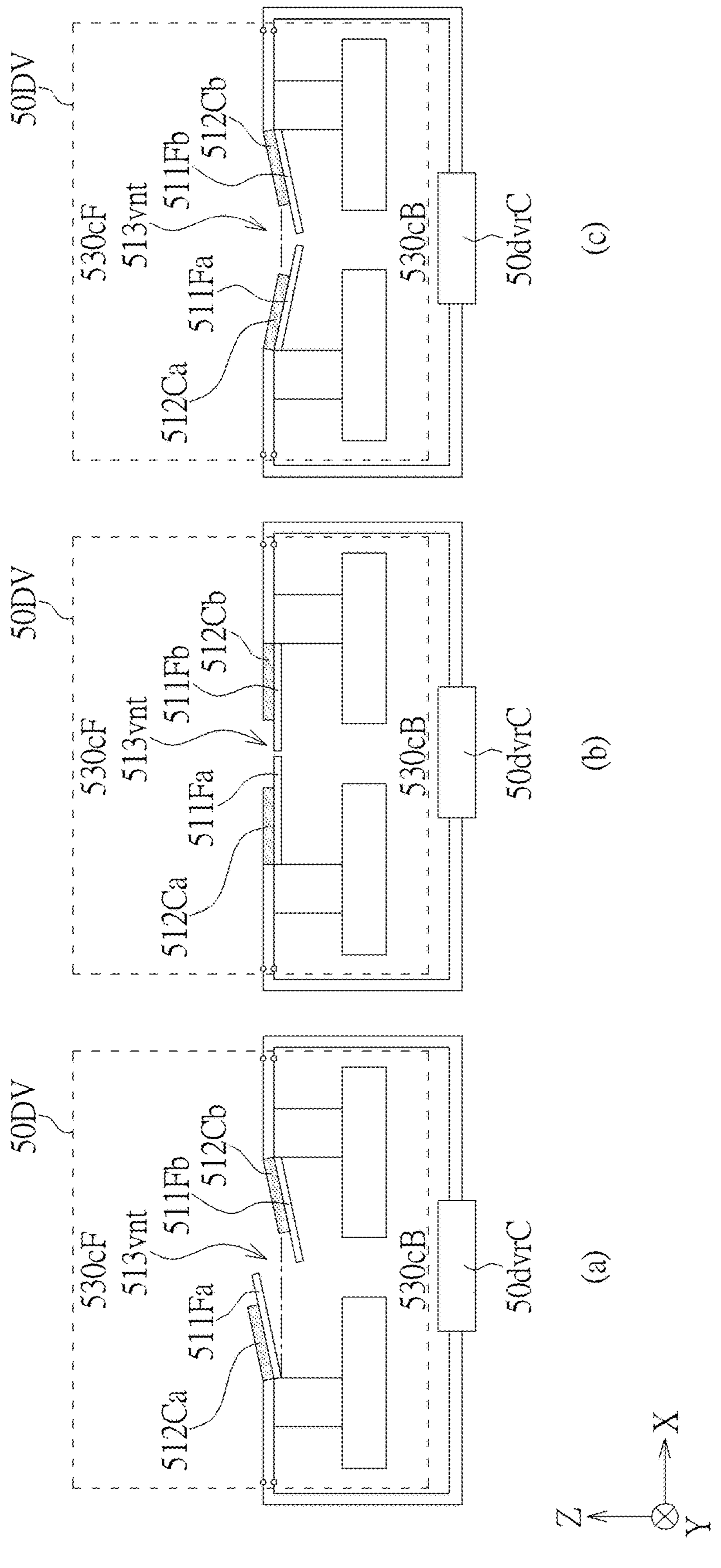
FIG. 5 is a schematic diagram of a venting device according to an embodiment of the present application.

For example, a film structure and volumes 530*c*F and 530*c*B of a venting device 50DV are illustrated in FIG. 5. The venting device 10DV or 40DV may be implemented by the venting device 50DV As shown in FIG. 5, the film structure of a venting device 50DV, which comprises flaps 511Fa and 511Fb opposite to each other, divides the space into the volumes 530*c*F and 530*c*B. The flap 511Fa/511Fb may be actuated by actuating portion 512Ca/512Cb to bend/pivot upward or downward, thereby resulting in a dynamic vent 513vnt in response to signals of a driving circuit 50drvC.

A dynamic vent is more versatile than a traditional fixed vent. For example, FIG. 5 demonstrates three different modes of the venting device 50DV: an open mode to form the vent 513vnt, a close mode to seal the vent 513vnt, and a comfort mode to slightly open the vent 513vnt. These three different modes indicate the venting device 50DV is a dynamic vent, and allow users to customize audio experience according to their individual preferences.

The venting device 50DV is said to be operated in the open mode when the flaps 511Fa and 511Fb are actuated to bend oppositely as shown in FIG. 5 (*a*). The opposite movement/orientation of the flaps 511Fa and 511Fb forms the vent 513vnt with a first opening width. An airflow passage is thus created between the volume 530*c*F (connected to or to be connected to an ear canal) and a volume 530*c*B (connected to or to be connected to the external ambient environment) to release pressure caused by occlusion effect. As a result, the frequency response curve may drop off quite noticeably (as it extends towards lower frequencies).

The venting device 50DV is said to be operated in the close mode when the flaps 511Fa and 511Fb align themselves substantially parallel to each other to close/seal the vent 513vnt, as shown in FIG. 5 (*b*), and the vent 513vnt has a second opening width. In the close mode, the vent device 50DV blocks background noise from entering the ear canal for improved passive isolation. The volumes 530*c*F and 530*c*B are barely connected, which can avoid significant drops in sound pressure level (SPL) at lower frequencies. By minimizing the loss of bass through the vent 513vnt, the venting device 50DV enhances audio experience.

The venting device 50DV is said to be operated in the comfort mode when the flaps 511Fa and 511Fb hang neutrally/loosely as shown in FIG. 5 (*c*). In the comfort mode, the flaps 511Fa and 511Fb may tilt below a horizontal level, which is defined by their anchored portions, and the vent 513vnt has a third opening width. The frequency response curve corresponding to the comfort mode may exhibit a gradual decrease toward the low-end of the spectrum.

Opening width herein can be evaluated as a distance between the tips (or free ends) of the two flaps (511Fa and 511Fb), which can be regarded as a kind of degree of opening. The second opening width is the narrowest of the three, and the first opening width is larger than the third opening width or the thickness of each flap. That is, the degree of opening of the comfort mode is between the degree of opening of the open mode and the degree of opening of the close mode.

The reduced leak of the comfort mode also improves low-frequency bass feel during music play, compared to the open mode. The vent device 50DV can be switched from the comfort mode to the close mode when the user prefers increased passive isolation for ambient noise reduction and/or focused media listening.

The small vent 513vnt created in the comfort mode may relieve pressure building up in the ear canal to improve comfort. Specifically, operating in the comfort mode creates a leak path that reduces the intensity level of occlusion effects, thereby reducing ear canal pressure for extended earbud usage time. For complete occlusion effect cancelation, the vent device 50DV might be switched from the comfort mode to the open mode, at the expense of higher energy consumption.

Operating the venting device 50DV in the comfort mode is energy-efficient, compared to the open mode and the close mode. In the comfort mode, the vent device 50DV is in its lowest power state, since low/no power would be applied on the actuators 512Ca and 512Cb on the flaps 511Fa and 511Fb (e.g., the driving voltage applied on one actuator may be either 0V or floating).

In addition, operating in the comfort mode also increases ambient awareness. Speech intelligibility may be improved, in the comfort mode over the close mode, by providing a physical passthrough for more natural one-on-one conversations, instead of digitally manipulation with most active passthrough functions that use microphone(s), digital signal processor(s) (DSP), and speaker(s) to amplify human voices. Safety would be improved, in the comfort mode over the close mode, by providing a direct and more natural passthrough of environmental and situational noise (e.g., oncoming car or siren). The vent device 50DV can be switched back to the close mode when the user prefers increased passive isolation for ambient noise reduction and/or focused media listening.

When the venting device (10DV or 40DV) is in the front volume (101 or 401) and collocated with the sound producing device (10SPD or 40SPD), any static vent (with or without mesh) should be eliminated. Upon removing the static vent, the resistance of the venting device in various modes (e.g., the open mode, the close mode, or the comfort mode) are calculated and compared to a static vent acoustic resistance (impedance). After computing the acoustic impedance of the venting device in various modes, the front volume is shaped to compensate for the required acoustic front volume impedance for the sound producing device, thereby ensuring the best possible frequency response for each mode.

It is crucial to establish a perfect seal around the venting device (10DV or 40DV) when mounted in the front volume (101 or 401), as an imperfect seal will significantly degrade performance. Similarly, a perfect seal around the sound producing device (10SPD or 40SPD) is formed when the sound producing device is mounted in the front volume, taking into account its relationship with the venting device.

A dimension of the venting device 10DV or 40DV (e.g., the width or the length of its film structure) may be smaller than a dimension of the sound producing device 10SPD or 40SPD (e.g., the width or the length of its film structure). The dimension of the sound producing device may be related to a wavelength corresponding to an operating frequency of the sound producing device (e.g., one quarter of the wavelength, half the wavelength, or one wavelength), while the dimension of the venting device may be not. Additionally, the length of time of the open, close, or comfort mode of the venting device may be unrelated to or longer than the operating frequency of the sound producing device or an audio signal inputted into the sound producing device.

Figure 7:
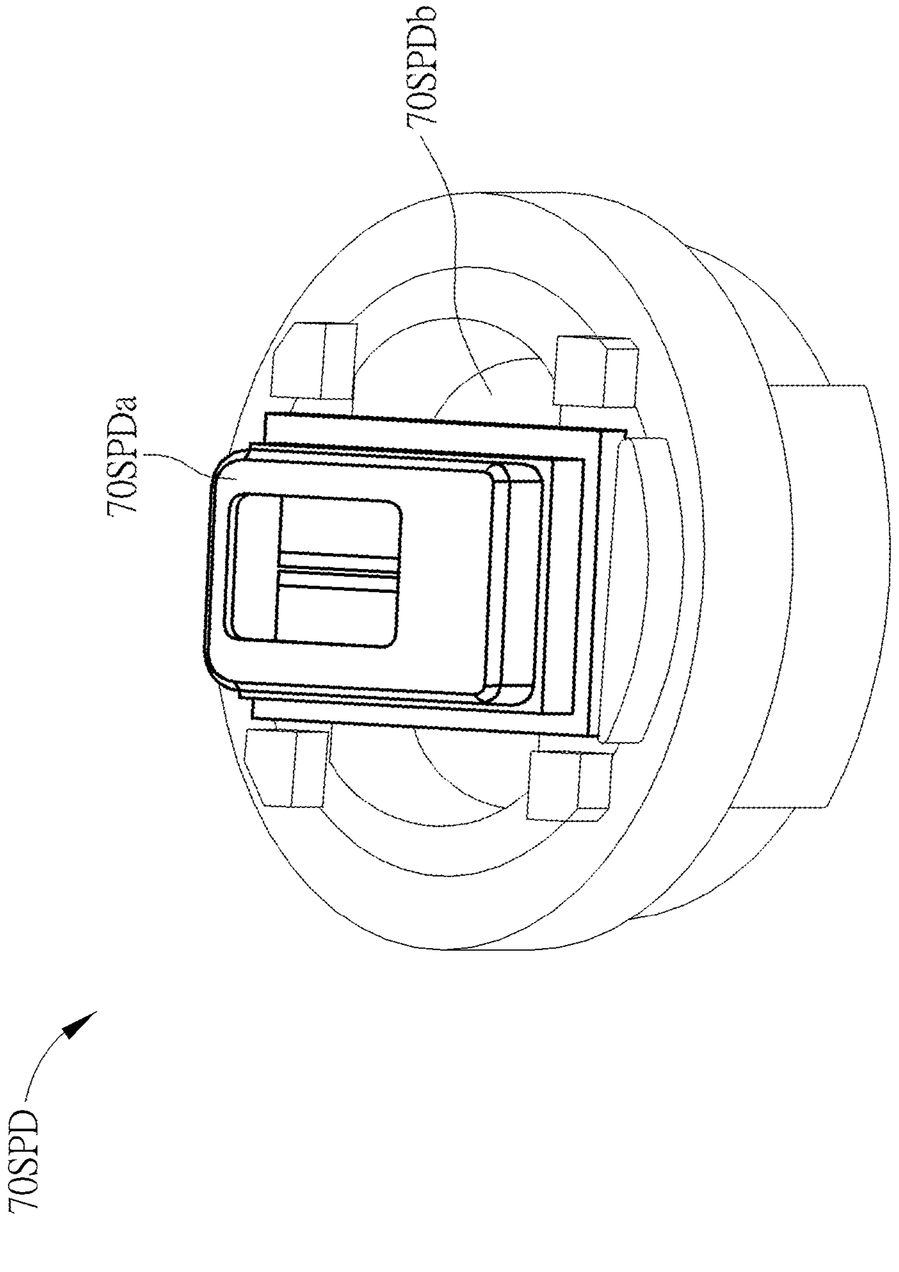
FIG. 7 is a schematic diagram of a sound producing device according to an embodiment of the present application.

The sound producing device (10SPD or 40SPD) may be or comprise a speaker (e.g., a two-way speaker) or a transducer. For example, a sound producing device 70SPD shown in FIG. 7 comprises sound producing sub-devices 70SPDa and 70SPDb to serve as a two-way speaker. The sound producing sub-device 70SPDa, which functions as a tweeter, may be implemented by a MEMS device disclosed in, for example, U.S. application Ser. No. 17/720,333. The sound producing sub-device 70SPDb, which functions as a woofer, may be implemented by an audio dynamic driver (DD) or a moving-coil speaker. A film structure of the sound producing device 70SPD, or the sound producing sub-device 70SPDa or 70SPDb may be a membrane, a flap pair, or any type of flexible component capable of vibrating in response to a signal to produce acoustic or sound waves.

Figure 6:
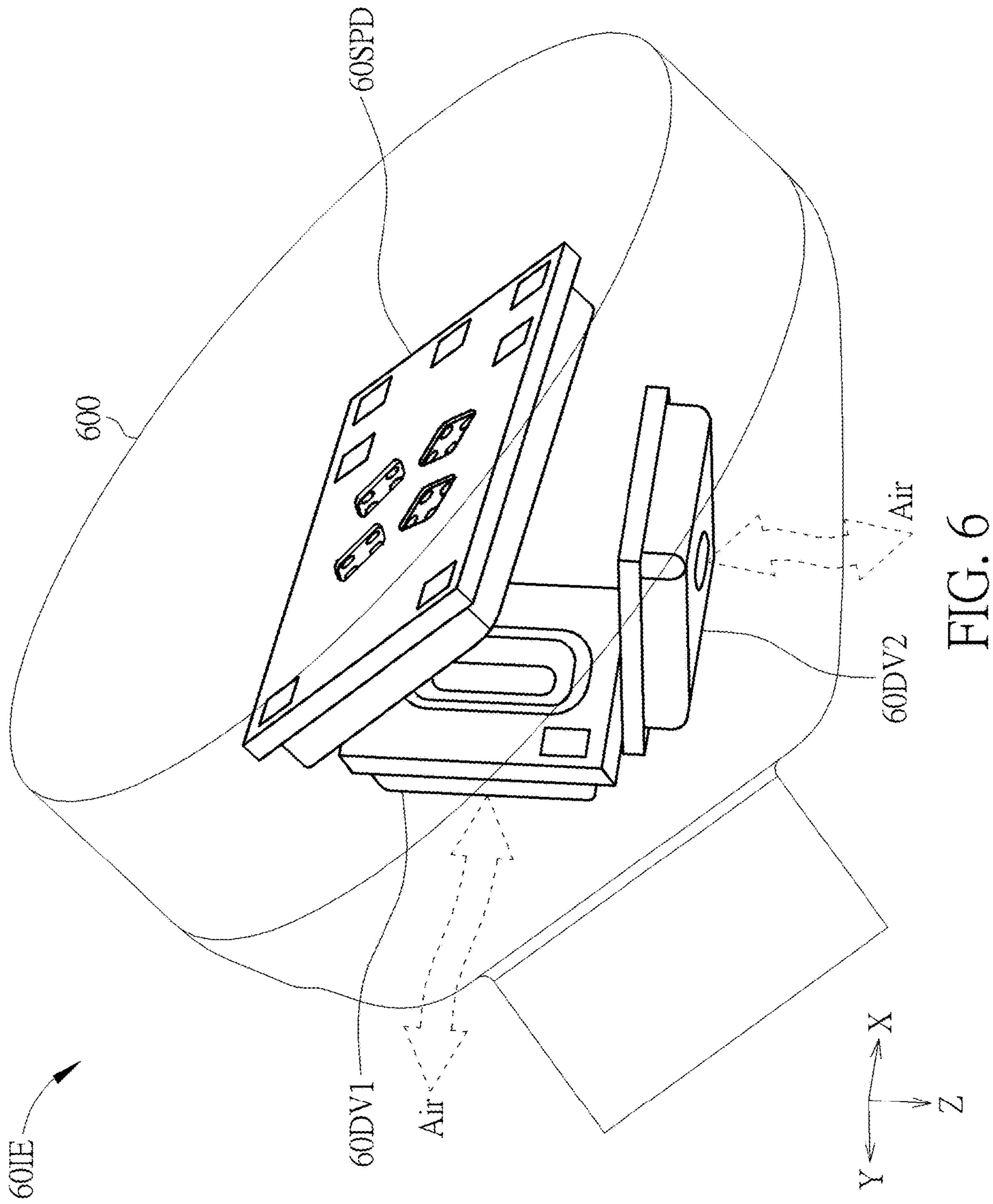
FIG. 6 is a schematic diagram of a wearable sound device according to an embodiment of the present application.

In FIGS. 1-4, only one venting device (10DV or 40DV) is disposed within one wearable sound device (10 or 40); however, the present application is not limited thereto. There may be more venting devices disposed in one wearable sound device. For example, FIG. 6 illustrates venting devices 60DV1 and 60DV2 of a wearable sound device 60. A sound producing device 60SPD, the venting devices 60DV1 and 60DV2 of the wearable sound device 60 may be implemented by the sound producing device 10SPD (or 40SPD) and the venting device 10DV (or 40DV), respectively.

In FIG. 6, the venting devices 60DV1 and 60DV2 are disposed symmetrically. When the venting device 60DV1 or 60DV2 open its vent, air may flow in the directions shown by the corresponding dashed arrow.

The wearable sound device (e.g., 10, or 40) may be an in-ear device, earbud, earphone, TWS (TWS: true wireless stereo), headphone, or hearing aid. The venting device (e.g., 10DV 40DV, 50DV, 60DV1, or 60DV2) may be a Micro Electro Mechanical System (MEMS) device. The sound producing device (e.g., 10DV, 40DV, or 60SPD) may be or comprise any type of electroacoustic transducer (e.g., a MEMS device), any type of speaker, or a combination thereof. MEMS fabricated venting device or sound producing device disclosed in U.S. application Ser. Nos. 17/842,810, 17/344,980, 17/344,983, 17/720,333 may be exploited in the wearable sound device of the present application, which is not limited thereto.

Details or modifications of a wearable sound device, a sound producing device, or a venting device are disclosed in U.S. application Ser. Nos. 17/842,810, 17/344,980, 17/344,983, 17/720,333, 18/172,346, 18/303,599, 18/366,637, 18/530,235, and U.S. Provisional Application No. 63/320,703, the disclosure of which is hereby incorporated by reference herein in its entirety and made a part of this specification.

For example, as detailed in U.S. application Ser. Nos. 17/842,810, 17/344,980, and 17/344,983, the venting device may comprise a film structure with a slit formed thereon, such that a vent, connecting the front volume to the ambient, can be formed because of the slit.

Furthermore, U.S. application Ser. Nos. 17/842,810, 17/344,980, and 17/344,983 also teach an acoustic transducer comprising a film structure which can be actuated to form vent(s) (to connect the front volume to the ambient) as well as perform acoustic transformation (e.g., producing sound). Disposing the acoustic transducer capable of both forming the vent and producing sound in the front volume is also within the scope of the present application.

To sum up, the venting device of the present application is properly placed inside a wearable sound device to achieve optimal user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wearable sound device, comprising:

a venting device, configured to form a vent to connect a first volume within the wearable sound device and ambient; and a sound producing device, adjacent to the venting device, configured to produce sound toward the first volume;

wherein the venting device comprises a first flap and a second flap disposed opposite to each other;

wherein the venting device comprises a first actuating portion disposed on the first flap and a second actuating portion disposed on the second flap;

wherein the first flap and the second flap are actuated to bend oppositely to open the vent.

2. The wearable sound device of claim 1, wherein the first volume is a front volume to be connected to an ear canal of a user.

3. The wearable sound device of claim 1, wherein an angle between a film structure of the venting device and a film structure of the sound producing device is substantially between 0 and 90 degrees.

4. The wearable sound device of claim 1, wherein a film structure of the venting device is substantially perpendicular or parallel to a film structure of the sound producing device.

5. The wearable sound device of claim 1, wherein the venting device operates in a close mode, an open mode, or a comfort mode.

6. The wearable sound device of claim 5, wherein a degree of opening of the comfort mode is between a degree of opening of the open mode and a degree of opening of the close mode.

7. The wearable sound device of claim 5, wherein in the open mode, the first flap is actuated to bend upward with a first displacement and the second flap is actuated to bend downward with a second displacement, and a difference between the first displacement and the second displacement is larger than a thickness of the first flap;

wherein in the close mode, the first flap and the second flap are actuated to be substantially parallel to each other;

wherein in the comfort mode, the first flap and the second flap hang below a level corresponding to their anchored portions.

8. The wearable sound device of claim 1, wherein the venting device comprises a film structure with a slit formed thereon, and the vent is formed because of the slit.

9. The wearable sound device of claim 1, further comprising:

a plurality of venting devices, configured to form a plurality of vents to connect the first volume and the ambient.

10. The wearable sound device of claim 1, wherein the sound producing device comprises a first sound producing sub-device functioning as a tweeter and a second sound producing sub-device functioning as a woofer, wherein the first sound producing sub-device is MEMS (Micro Electro Mechanical System) fabricated, wherein the second sound producing sub-device comprises an audio dynamic driver or a moving-coil speaker.

11. A manufacture method, for manufacturing a wearable sound device, comprising:

forming a venting device;

forming a sound producing device, adjacent to the venting device; and assembling the venting device and the sound producing device, such that the venting device is configured to form a vent to connect a first volume within the wearable sound device and ambient, and the sound producing device is configured to produce sound toward the first volume;

wherein the venting device comprises a first flap and a second flap disposed opposite to each other;

wherein the venting device comprises a first actuating portion disposed on the first flap and a second actuating portion disposed on the second flap;

wherein the first flap and the second flap are actuated to bend oppositely to open the vent.

12. The manufacture method of claim 11, wherein the first volume is a front volume.

13. The manufacture method of claim 11, wherein an angle between a film structure of the venting device and a film structure of the sound producing device is substantially between 0 and 90 degrees.

14. The manufacture method of claim 11, wherein a film structure of the venting device is substantially perpendicular or parallel to a film structure of the sound producing device.

15. The manufacture method of claim 11, wherein the venting device operates in a close mode, an open mode, or a comfort mode.

16. The manufacture method of claim 15, wherein a degree of opening of the comfort mode is between a degree of opening of the open mode and a degree of opening of the close mode.

17. The manufacture method of claim 15, wherein in the open mode, the first flap is actuated to bend upward with a first displacement and the second flap is actuated to bend downward with a second displacement, and a difference between the first displacement and the second displacement is larger than a thickness of the first flap;

wherein in the close mode, the first flap and the second flap are actuated to be substantially parallel to each other;

wherein in the comfort mode, the first flap and the second flap hang below a level corresponding to their anchored portions.

18. The manufacture method of claim 11, wherein the venting device comprises a film structure with a slit formed thereon, and the vent is formed because of the slit.

19. The manufacture method of claim 11, further comprising:

forming a plurality of venting devices; and assembling the plurality of venting devices and the sound producing device, such that the plurality of venting devices are configured to form a plurality of vents to connect the first volume and the ambient.

20. The manufacture method of claim 11, wherein the sound producing device comprises a first sound producing sub-device functioning as a tweeter and a second sound producing sub-device functioning as a woofer, wherein the first sound producing sub-device is MEMS (Micro Electro Mechanical System) fabricated, wherein the second sound producing sub-device comprises an audio dynamic driver or a moving-coil speaker.

21. The wearable sound device of claim 1, wherein a film structure of the sound producing device divides a space within the wearable sound device into the first volume and a second volume.

* * * * *